United States Patent
Chao et al.

(10) Patent No.: US 11,960,918 B2
(45) Date of Patent: Apr. 16, 2024

(54) CREATING PRODUCT ORCHESTRATION ENGINES

(71) Applicant: Dell Products, L.P., Round Rock, TX (US)

(72) Inventors: Cy Chao, Austin, TX (US); Richard Ang, Medina, WA (US); Anil Varkhedi, San Jose, CA (US); Helen He, Cary, NC (US)

(73) Assignee: DELL PRODUCTS L.P., Round Rock, TX (US)

( * ) Notice: Subject to any disclaimer, the term of this patent is extended or adjusted under 35 U.S.C. 154(b) by 437 days.

(21) Appl. No.: 17/384,540

(22) Filed: Jul. 23, 2021

(65) Prior Publication Data

US 2023/0027902 A1    Jan. 26, 2023

(51) Int. Cl.
- *G06F 9/455* (2018.01)
- *G06F 8/36* (2018.01)
- *G06F 8/61* (2018.01)

(52) U.S. Cl.
CPC ............ *G06F 9/45558* (2013.01); *G06F 8/36* (2013.01); *G06F 8/63* (2013.01); *G06F 2009/45562* (2013.01)

(58) Field of Classification Search
CPC .......... G06F 9/45558; G06F 8/36; G06F 8/63; G06F 2009/45562
See application file for complete search history.

(56) References Cited

U.S. PATENT DOCUMENTS

| | | | |
|---|---|---|---|
| 8,261,295 B1 * | 9/2012 | Risbood | H04L 41/5012 717/177 |
| 10,318,265 B1 | 6/2019 | To et al. | |
| 10,318,320 B1 | 6/2019 | Thomas et al. | |
| 11,050,787 B1 * | 6/2021 | Sharifi Mehr | G06F 9/45558 |
| 11,477,165 B1 | 10/2022 | McDowall et al. | |
| 11,601,342 B1 * | 3/2023 | Chao | H04L 41/40 |
| 2013/0275596 A1 * | 10/2013 | Subramaniam | G06F 9/45558 709/226 |
| 2016/0266921 A1 | 9/2016 | Mao et al. | |
| 2018/0046482 A1 | 2/2018 | Karve et al. | |

(Continued)

OTHER PUBLICATIONS

Office Action dated Apr. 11, 2023 for U.S. Appl. No. 17/384,554, 51 pages.

(Continued)

*Primary Examiner* — Benjamin C Wu

(74) *Attorney, Agent, or Firm* — Amin, Turocy & Watson, LLP

(57) ABSTRACT

A system can receive information about a first orchestration service that indicates a mapping from an application programming interface (API) to an executable script, and a dependency of the first orchestration service on a second orchestration service. The system can, in response to receiving the information, creating a base container image for the first orchestration service. The system can associate the API with executing the executable script on the base container image. The system can associate the dependency of the first orchestration service on the second orchestration service with the base container image. The system can, in response to receiving data indicative of a request to create an instance of the first orchestration service, creating an instance of the base container image.

20 Claims, 10 Drawing Sheets

(56) References Cited

U.S. PATENT DOCUMENTS

| | | |
|---|---|---|
| 2018/0145884 A1 | 5/2018 | Stefanov et al. |
| 2018/0316572 A1 | 11/2018 | Kamalakantha et al. |
| 2018/0321967 A1 | 11/2018 | Barker et al. |
| 2019/0303187 A1* | 10/2019 | Vu .................. G06F 9/45558 |
| 2020/0110638 A1 | 4/2020 | Asthana et al. |
| 2020/0192689 A1 | 6/2020 | Smith, IV et al. |
| 2020/0394048 A1 | 12/2020 | Chen et al. |
| 2021/0200814 A1 | 7/2021 | Tal et al. |
| 2021/0311760 A1 | 10/2021 | Oki et al. |
| 2021/0328873 A1 | 10/2021 | Yeung et al. |
| 2022/0327006 A1 | 10/2022 | Makhija et al. |
| 2022/0350628 A1* | 11/2022 | Parry-Barwick ..... H04L 9/3247 |
| 2022/0365771 A1 | 11/2022 | Shelke et al. |
| 2022/0385532 A1 | 12/2022 | Erez et al. |
| 2023/0023945 A1 | 1/2023 | Chao et al. |
| 2023/0024067 A1 | 1/2023 | Li |
| 2023/0106879 A1* | 4/2023 | Ryman .................. H04L 67/133 718/1 |
| 2023/0229482 A1* | 7/2023 | Sinha .................... G06F 9/5077 718/1 |
| 2023/0244466 A1* | 8/2023 | Shah ........................ G06F 8/71 717/178 |

OTHER PUBLICATIONS

Notice of Allowance mailed Sep. 26, 2023 for U.S. Appl. No. 17/384,554, 43 pages.

* cited by examiner

900

902

CREATE A BASE CONTAINER IMAGE FOR AN ORCHESTRATION SERVICE 904

ASSOCIATE AN API CALL WITH EXECUTING AN EXECUTABLE SCRIPT THAT CORRESPONDS TO THE ORCHESTRATION SERVICE ON THE BASE CONTAINER IMAGE 906

IN RESPONSE TO RECEIVING DATA INDICATIVE OF THE API CALL, CREATING AN INSTANCE OF THE BASE CONTAINER IMAGE, AND EXECUTING THE EXECUTABLE SCRIPT ON THE INSTANCE OF THE BASE CONTAINER IMAGE 908

CREATING PRODUCT ORCHESTRATION ENGINES

BACKGROUND

In computing, orchestration can generally comprise configuring and managing computer hardware and software. A container can generally comprise a software environment in which an application and its dependencies can be run, separate from other containers, and utilizing a host operating system (compared with a guest operating system within the software environment, as with a virtual machine).

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can receive information about a first orchestration service that indicates a mapping from an application programming interface (API) to an executable script, and a dependency of the first orchestration service on a second orchestration service. The system can, in response to receiving the information, creating a base container image for the first orchestration service. The system can associate the API with executing the executable script on the base container image. The system can associate the dependency of the first orchestration service on the second orchestration service with the base container image. The system can, in response to receiving data indicative of a request to create an instance of the first orchestration service, creating an instance of the base container image.

An example method can comprise receiving, by a system comprising a processor, information about an orchestration service that indicates a mapping from an API to an executable script. The method can further comprise, based on the information, creating, by the system, a base container image for the orchestration service. The method can further comprise associating, by the system, the API with executing the executable script on the base container image. The method can further comprise, in response to receiving data indicative of a request to create an instance of the orchestration service, creating, by the system, an instance of the base container image based on the data, and executing, by the system, the executable script on the instance of the base container image.

These operations can comprise creating a base container image for an orchestration service. The operations can further comprise associating an API call with executing an executable script that corresponds to the orchestration service on the base container image. The operations can further comprise, in response to receiving data indicative of the API call, creating an instance of the base container image, and executing the executable script on the instance of the base container image.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 9 illustrates another example process flow for creating product orchestration engines, in accordance with an embodiment of this disclosure;

DETAILED DESCRIPTION

Overview

Figure 1:
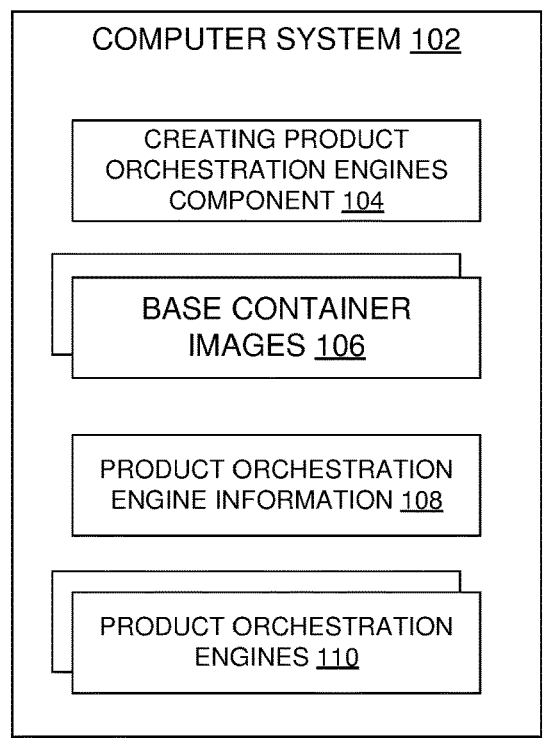
FIG. 1 illustrates an example system architecture that can facilitate creating product orchestration engines, in accordance with an embodiment of this disclosure.

There are orchestration services that automate full stack product provisioning and life cycle management. Full stack product provisioning and life cycle management can be a complex matter. Implementing full stack product provisioning and life cycle management can require domain knowledge and expertise across a wide range pf products. Full stack products can range from hardware (including network, compute, and storage), to operating systems, hypervisor platform infrastructure, server management software, cloud infrastructure software, and software applications.

Some techniques can decompose this complex full-stack product orchestration problem into a collection of single product orchestration problems, which can each be implemented with a product orchestration engine (POE). Product orchestration engines can handle different tasks, such as a network orchestration engine, a compute orchestration engine, a storage orchestration engine, a cloud orchestration engine, and an application orchestration engine. A product orchestration engine can provision and manage a life cycle for a specific product, a family of products, or a type of products. Decomposing orchestration into a single task can simplify a complex orchestration problem where developing a product orchestration engine for one product can require less domain knowledge (that of one product, or one type of product).

Decomposing orchestration can still have complexity. A product can require a certain amount of computing resources, infrastructure services, and software resources to operate. So, one product orchestration engine can depend on other product orchestration engines in an orchestration flow. For a product orchestration engine developer to specify a product's dependencies and to leverage services provided by other product orchestration engines can require cross-domain knowledge and expertise. Developing a product orchestration engine can be a complex task.

The present techniques can provide for simplifying development of a product orchestration engine. An intelligent product orchestration engine builder can determine resource and product dependencies to simplify product orchestration engine development. In an example according to these techniques, a product orchestration engine developer needs only to have product domain knowledge when using this intelligent product orchestration engine builder.

An orchestration service that coordinates multiple product orchestration engines in the course of orchestration can access product orchestration engine functions via a representational state transfer (REST) interface, such as an Orchestration Service Broker application programming interface (API) or a Common Orchestration Services API. In such examples, a product orchestration developer can provide product provisioning and management scripts, to specify a mapping from a REST API to the scripts (such as in a JavaScript Object Notation (JSON) formatted file), and to declare product resource requirements and target environment dependencies (such as in another JSON formatted file).

An intelligent product orchestration engine builder can utilize the following techniques to simplify a product orchestration engine development process and not to require product orchestration engine developers to have cross-product domain knowledge.

One technique to simplify a product orchestration engine development process can involve dependency resolution automation. Another technique to simplify a product orchestration engine development process can involve resource requirements declaration automation.

Another technique to simplify a product orchestration engine development process can involve tooling installation automation. A product orchestration engine integrated development environment (IDE) can permit product orchestration engine developers to import their existing product provisioning scripts and product life cycle management scripts. The product orchestration engine IDE can assist product orchestration engine developers to assign scripts to various API calls.

The product orchestration engine IDE can automatically install required configuration management and provisioning automation tools to a product orchestration engine container image. This can be accomplished by inspecting well-known scripts file types. Furthermore, the product orchestration engine IDE can parse scripts to check required providers or modules, and automatically install the required providers and modules to the product orchestration engine container image.

Another technique to simplify a product orchestration engine development process can involve product orchestration engine container image optimization automation.

These techniques can be leveraged to simplify product orchestration engine development. Using these techniques, a product orchestration engine developer can simply drop scripts to a product orchestration engine IDE to create a new product orchestration engine container image.

Example Architectures

FIG. 1 illustrates an example system architecture 100 that can facilitate creating product orchestration engines, in accordance with an embodiment of this disclosure. System architecture 100 comprises computer system 102. In turn, computer system 102 comprises creating product orchestration engines component 104, base container images 106, product orchestration engine information 108, and product orchestration engines 110.

Figure 10:
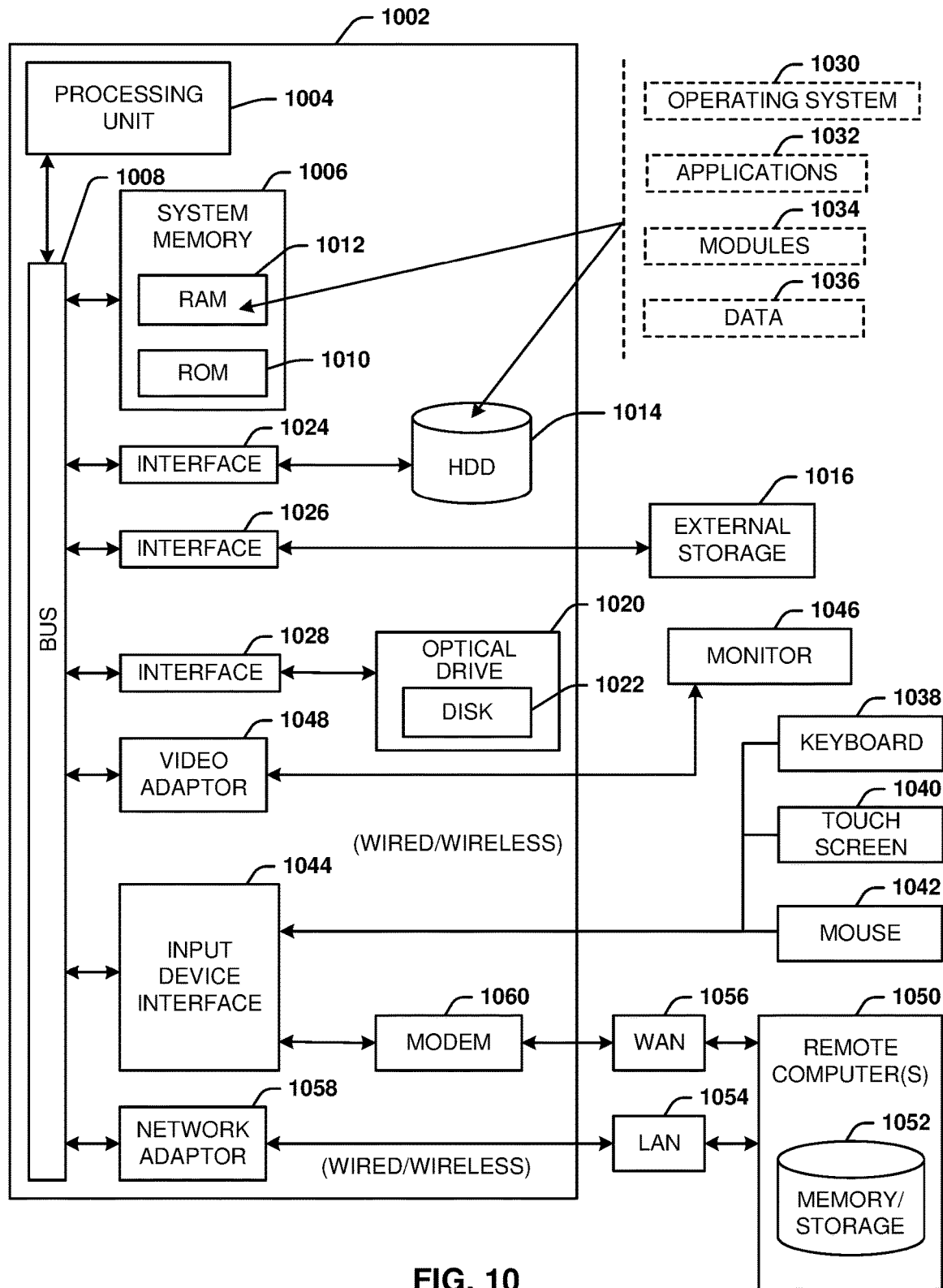
FIG. 10 illustrates an example block diagram of a computer operable to execute an embodiment of this disclosure.

In some examples, computer system 102 can be implemented with one or more instances of computer 1002 of FIG. 10.

Creating product orchestration engines component 104 can comprise a component that uses base container images 106 and product orchestration engines 110 to create a product orchestration engine of product orchestration engines 110. Base container images can comprise a set of container images with different functionality (such as cloud infrastructure provisioning tools) that can be used as the basis for creating a product orchestration engine in a container without creating a container from scratch. In other examples, creating product orchestration engines component 104 can create a new container from scratch when creating a product orchestration engine. These base container images can be stored in computer storage of computer system 102, and accessed by creating product orchestration engines component 104.

Product orchestration engine information 108 can comprise information received from a product orchestration engine developer that is specific to creating one type of product orchestration engine. Product orchestration engine information 108 can comprise product provisioning and life cycle management scripts, information on mapping application programming interface (API) calls to those scripts so that those scripts can be executed in response to an API call, and information about product resource requirements and target environment dependencies.

Figure 6:
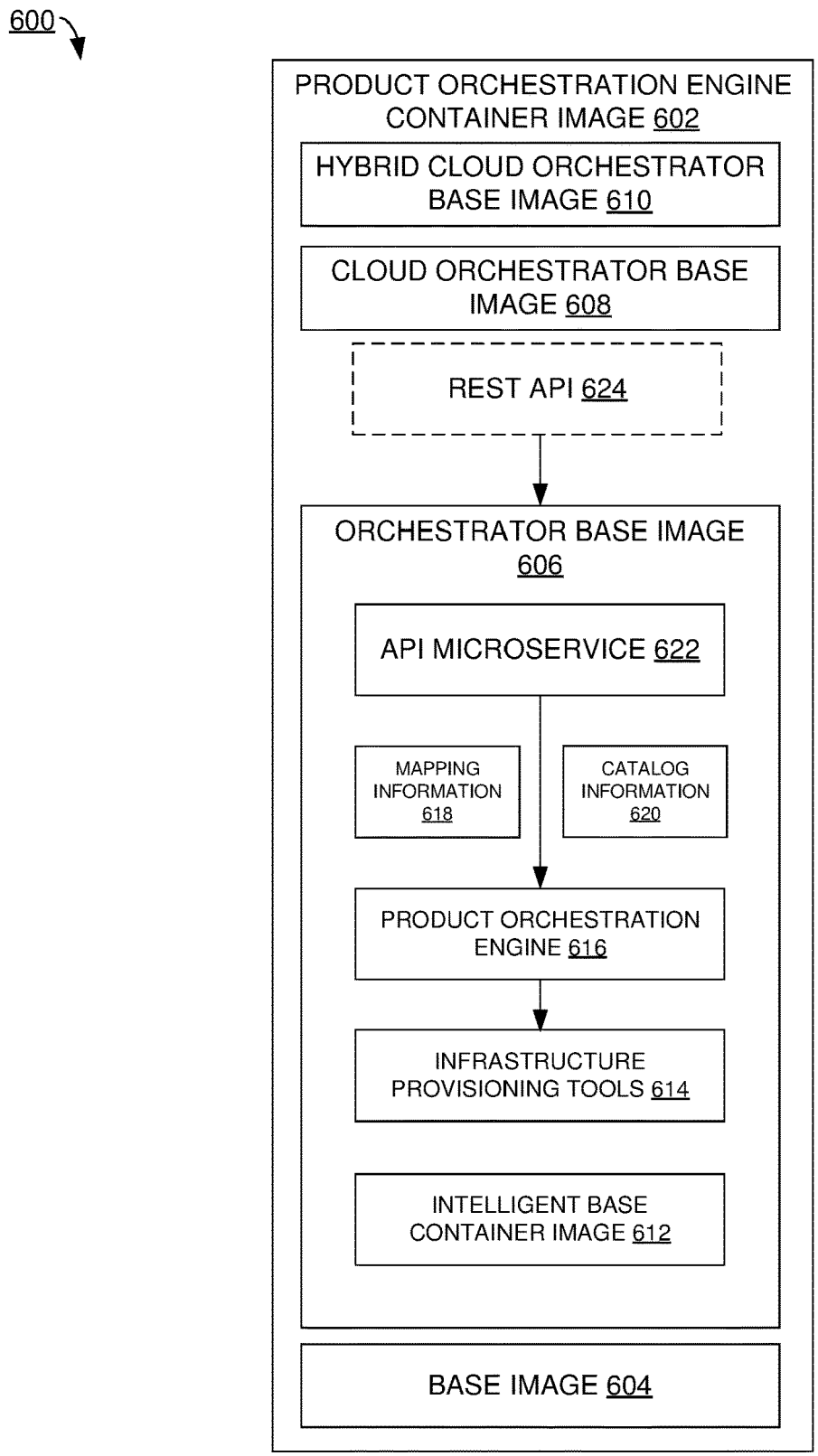
FIG. 6 illustrates an example system architecture for product orchestration engine container image optimization that can facilitate creating product orchestration engines, in accordance with an embodiment of this disclosure.
Figure 7:
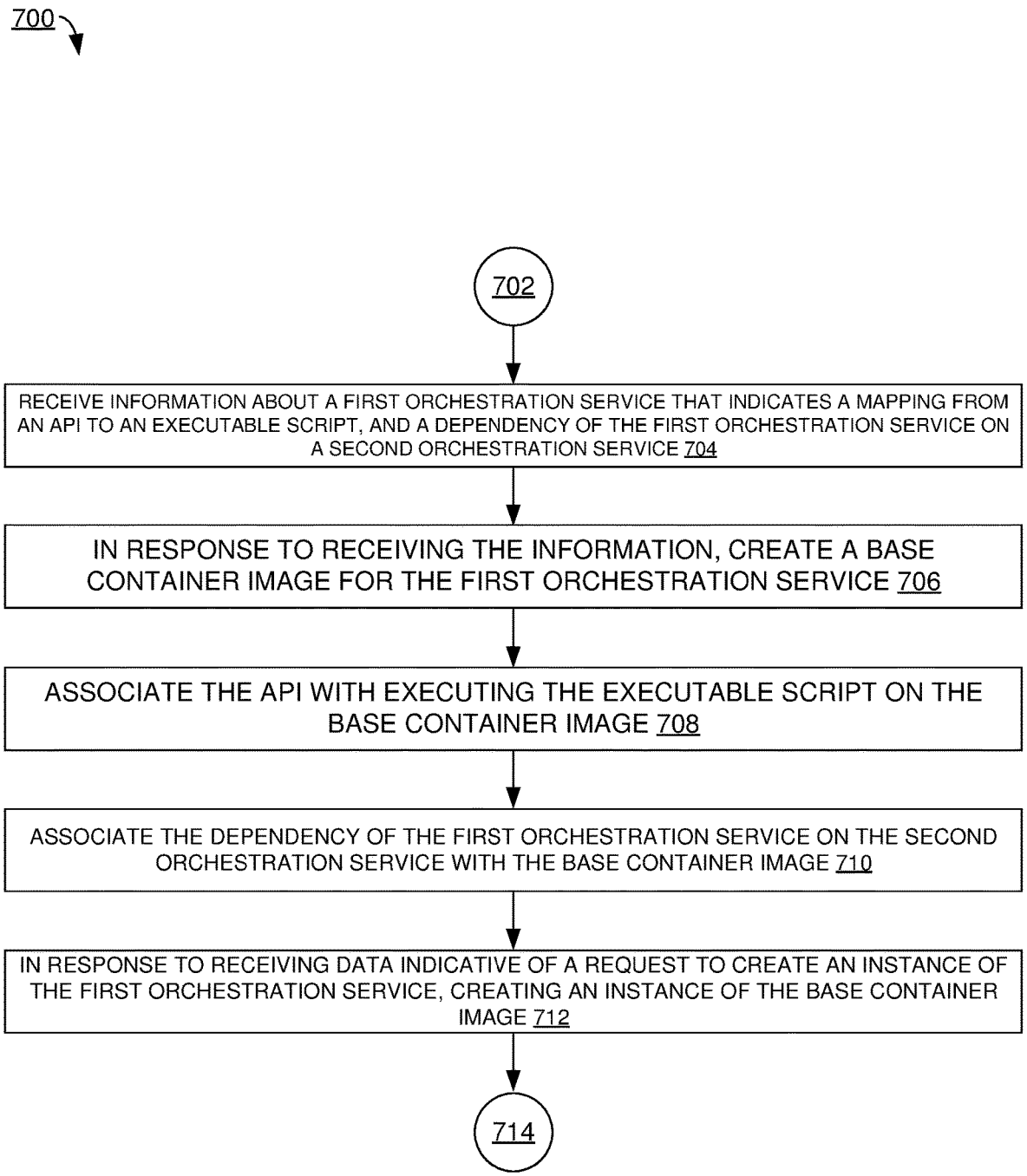
FIG. 7 illustrates an example process flow for creating product orchestration engines, in accordance with an embodiment of this disclosure.
Figure 8:
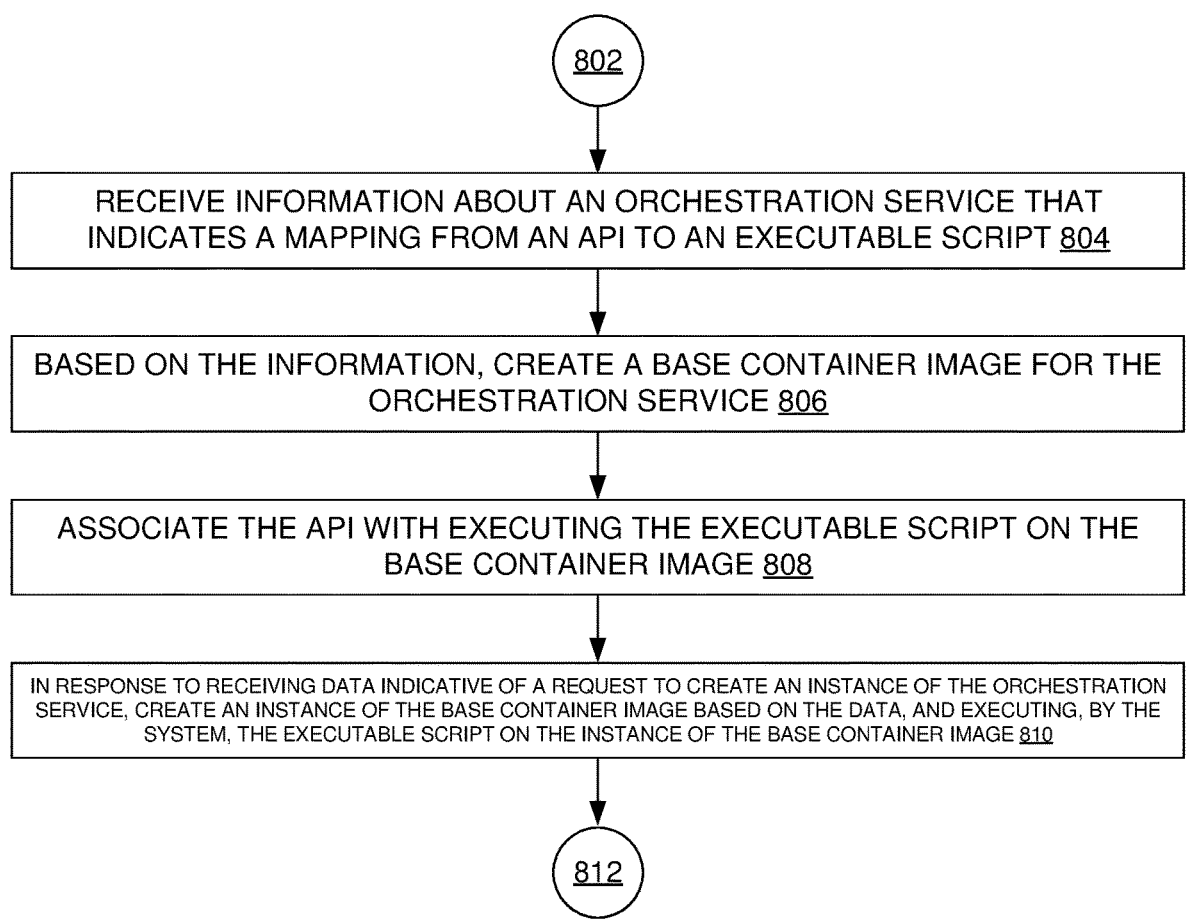
FIG. 8 illustrates another example process flow for creating product orchestration engines, in accordance with an embodiment of this disclosure.

In the course of implementing creating product orchestration engines, creating product orchestration engines component 104 can implement part(s) of process flow 700 of FIG. 7, process flow 800 of FIG. 8, and/or process flow 900 of FIG. 9. Additionally, in the course of implementing creating product orchestration engines, creating product orchestration engines component 104 can implement part(s) of system architecture 200 of FIG. 2, system architecture 300 of FIG. 3, system architecture 400 of FIG. 4, system architecture 500 of FIG. 5, and system architecture 600 of FIG. 6.

Figure 2:
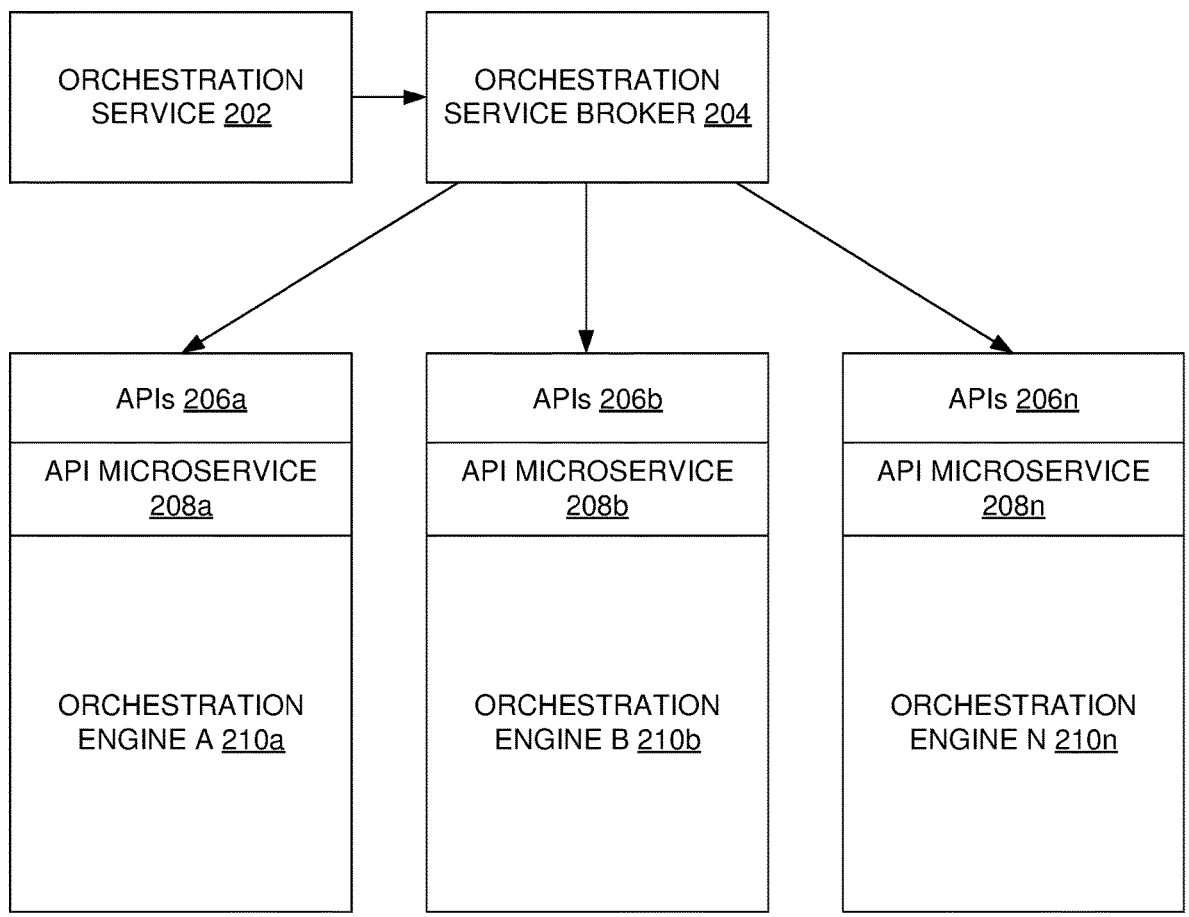
FIG. 2 illustrates another example system architecture that can facilitate creating product orchestration engines, in accordance with an embodiment of this disclosure.

FIG. 2 illustrates another example system architecture 200 that can facilitate creating product orchestration engines, in accordance with an embodiment of this disclosure. In some examples, part(s) of system architecture 200 can be used to implement creating product orchestration engines component 104 of FIG. 1.

System architecture 200 comprises orchestration service 202, orchestration service broker 204, APIs 206a, API microservice 208a, orchestration engine A 210a, APIs 206b, API microservice 208b, orchestration engine B 210b, APIs 206n, API microservice 208n, and orchestration engine N 210n.

Orchestration service 202 can create product orchestration engines, such as orchestration engine A 210a and orchestration engine B 210b. Orchestration service 202 can also use these product orchestration engines in concert to orchestrate applications. In some examples, each product orchestration engine is configured to orchestrate a single and distinct part, such as network or compute. Where an application uses both network and compute, then orchestration service 202 can invoke separate product orchestration engines for network and compute, respectively, to effectuate orchestrating this application.

To communicate with product orchestration engines, orchestration service 202 can utilize an API such as an API provided by orchestration service broker 204. In some examples, orchestration service 202 can operate on a cloud computing platform, while orchestration service broker 204 operates on a user's on premises computer system.

Each product orchestration engine can implement APIs (e.g., APIs 206a, APIs 206b, and APIs 206n). These APIs can be invoked by orchestration service 202, and when invoked, cause the respective product orchestration engine to invoke one or more scripts used in provisioning and lifecycle management of a product orchestration engine. Each product orchestration engine can also implement a microservice (e.g., microservice 208a, microservice 208b, and microservice 208n) that receives and processes API calls of the APIs.

Each product orchestration engine can also comprise the orchestration engine itself (e.g., orchestration engine A 210a, orchestration engine B 210b, and orchestration engine N 210n).

Figure 3:
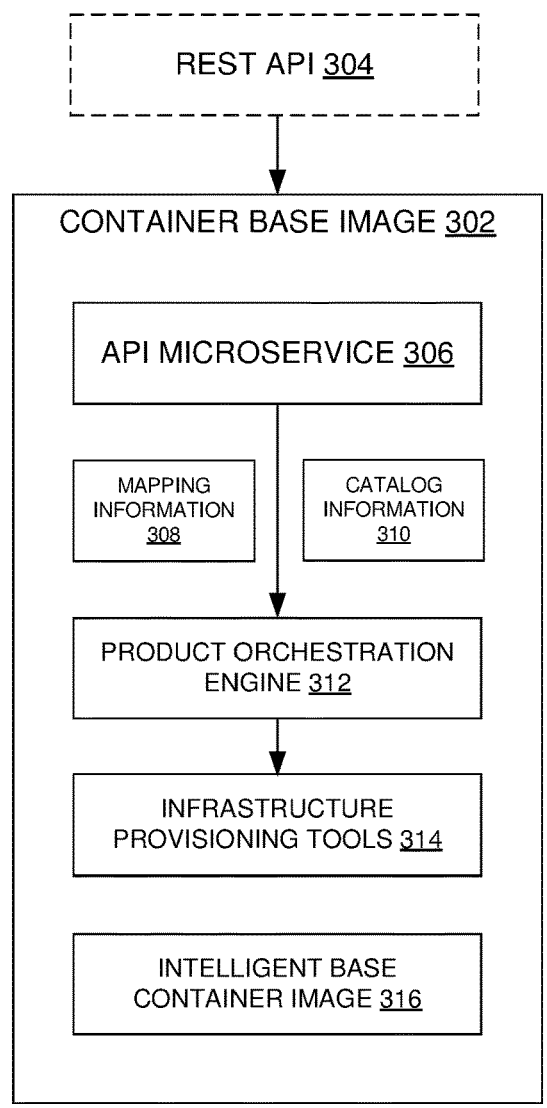
FIG. 3 illustrates an example system architecture of a product orchestration engine base image can facilitate creating product orchestration engines, in accordance with an embodiment of this disclosure.

FIG. 3 illustrates an example system architecture 300 of a product orchestration engine base image can facilitate creating product orchestration engines, in accordance with an embodiment of this disclosure. In some examples, part(s) of system architecture 300 can be used to implement creating product orchestration engines component 104 of FIG. 1.

System architecture comprises container base image 302 and REST API 304. In turn, container base image 302 comprises API microservice 306, mapping information 308, catalog information 310, product orchestration engine 312, infrastructure provisioning tools 316, and intelligent base container image 316.

Container base image 302 can be similar to a container of base container images 106 of FIG. 1. REST API 304 can comprise an API that is implemented by container base image 302 and that can be used to invoke the execution of one or more commands (such as scripts) on container base image 302. API microservice 306 can process API calls that are made according to REST API 304. Mapping information 308 can comprise information that is utilized to create a mapping between API calls of REST API 304 and scripts for provisioning and lifecycle management of a product orchestration engine. Catalog information 310 can comprise information that identifies product resource requirements and target environment dependencies of a product orchestration engine.

Infrastructure provisioning tools 314 can comprise components for automating and managing infrastructure components such as networks, firewalls, cloud services, and on-premises services. Intelligent base container image 316 can comprise an executable container.

Figure 4:
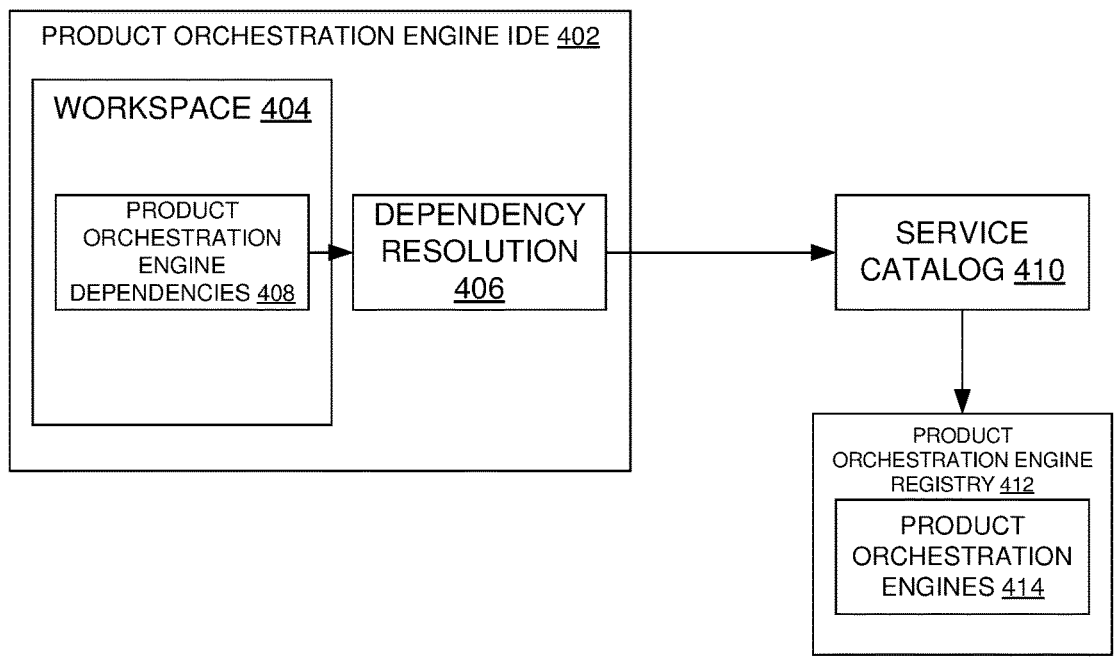
FIG. 4 illustrates an example system architecture for product orchestration engine dependency resolution that can facilitate creating product orchestration engines, in accordance with an embodiment of this disclosure.

FIG. 4 illustrates an example system architecture 400 for product orchestration engine dependency resolution that can facilitate creating product orchestration engines, in accordance with an embodiment of this disclosure. In some examples, part(s) of system architecture 400 can be used to implement creating product orchestration engines component 104 of FIG. 1.

System architecture 400 comprises product orchestration engine IDE 402, service catalog 410, and product orchestration engine registry. In turn, product orchestration engine IDE 402 comprises workspace 404 (comprising product orchestration engine dependencies 408) and dependency resolution 406. Product orchestration engine registry 412 comprises product orchestration engines 414.

Product orchestration engine IDE 402 can comprise an integrated development environment in which product orchestration engines can be developed. Workspace 404 can comprise a contained space within product orchestration engine IDE 402 for developing a particular product orchestration engine. Product orchestration engine dependencies 408 can comprise dependencies for a product orchestration engine that are identified by a developer of the product orchestration engine (e.g., an application can depend on cloud resources, which can depend on storage resources).

Dependency resolution 406 can comprise a component that identifies and/or resolves dependency conflicts present in product orchestration engine dependencies 408. In performing dependency resolution, dependency resolution 406 can make one or more API calls to service catalog 410, which can maintain information about product orchestration engines, such as a product name, service identifier, and other metadata. To generate this information about product orchestration engines, service catalog 410 can make one or more API calls to product orchestration engine registry 412, which maintains a registry of which product orchestration engines have been registered with a system. When a product orchestration engine is created, the product orchestration engine can be registered (as part of product orchestration engines 414) with product orchestration engine 412, so that a system can determine that a product orchestration engine is available.

System architecture 400 can be utilized to simplify a product orchestration engine development process can involve dependency resolution automation. When on-boarding a product to a product orchestration engine model, a product team can develop a product orchestration engine and push information about this new product orchestration engine to a registry of available product orchestration engines (e.g., produce orchestration engine registry 412). A central service (e.g., service catalog 410) can retrieve a product orchestration engine service catalog by accessing a product orchestration engine's corresponding API call. A product orchestration engine service catalog entry can contain a product name, a service identifier, and other metadata.

A product orchestration engine IDE (e.g., product orchestration engine IDE 402) can utilize an API catalog to retrieve service catalog entries from a service catalog. A product orchestration engine IDE dependency resolution component (e.g., dependency resolution 406) can assist a product orchestration engine developer in resolving product orchestration engine dependencies.

Figure 5:
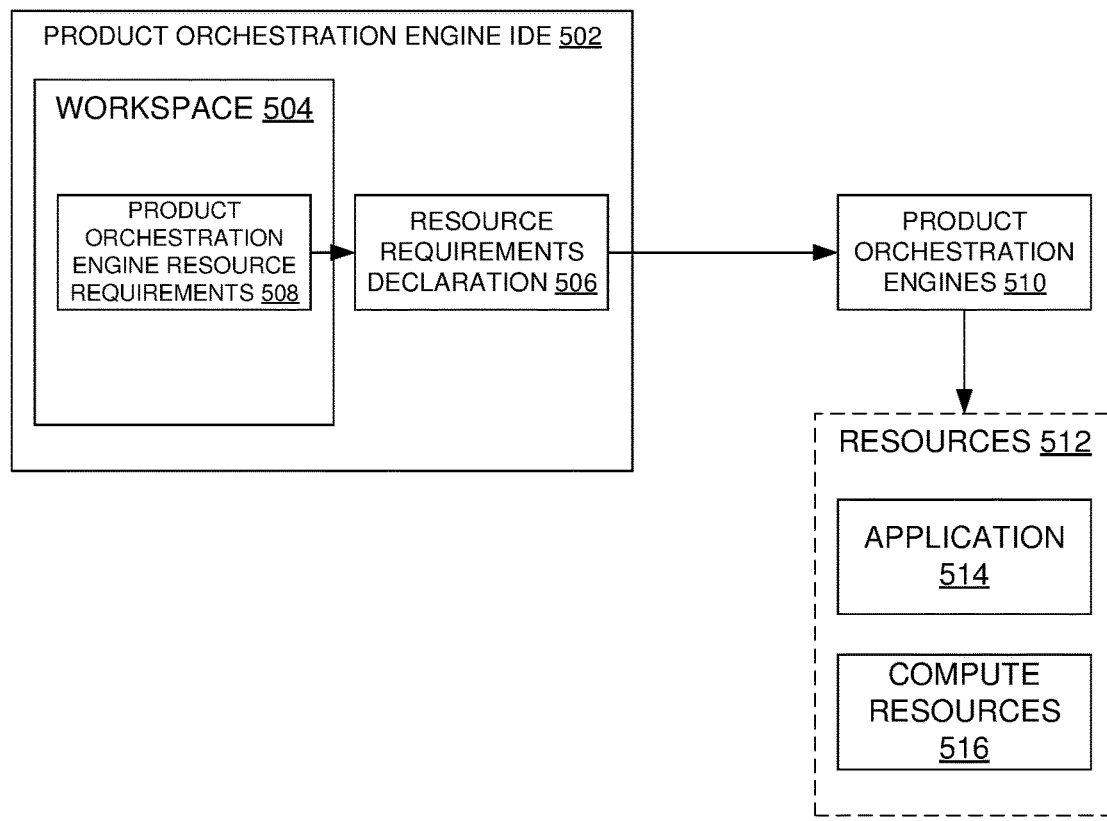
FIG. 5 illustrates an example system architecture for product orchestration engine resource requirement declarations that can facilitate creating product orchestration engines, in accordance with an embodiment of this disclosure.

FIG. 5 illustrates an example system architecture 500 for product orchestration engine resource requirement declarations that can facilitate creating product orchestration engines, in accordance with an embodiment of this disclosure. In some examples, part(s) of system architecture 500 can be used to implement creating product orchestration engines component 104 of FIG. 1.

System architecture 500 comprises product orchestration engine IDE 502 (which can be similar to product orchestration engine IDE 402 of FIG. 4), product orchestration engines 510, and resources 512. In turn, product orchestration engine IDE 402 comprises workspace 504 (which can be similar to workspace 404 of FIG. 4, and comprising product orchestration engine resource requirements 508) and resource requirements declaration 506. Product orchestration engines 510 can comprise one or more product orchestration engines and be similar to product orchestration engines 110 of FIG. 1. Resources 512 comprises application 514 and compute resources 516.

Product orchestration engine resource requirements 508 can comprise resource requirements for a particular product orchestration engine as specified by a developer of the product orchestration engine. Product orchestration engine IDE 502 can intake product orchestration engine resource requirements 508, and possibly alter them to produce resource requirements declaration 506, which can comprise those resources that are to be used in spinning up an instance of a service from a product orchestration engine.

To determine resource requirements declaration 506, product orchestration engine IDE 502 can also measure actual resources used by product orchestration engines 510 (such as through an API call to each product orchestration engine to determine its resource usage). These resources used by product orchestration engines 510 can be resources used in the course of those product orchestration engines executing, such as resources 512, and can comprise things like resources used from application 514 and compute resources 516.

System architecture 500 can be utilized to simplify a product orchestration engine development process can involve resource requirements declaration automation. This technique can be used to generate a resource requirements catalog contents automatically through automated testing.

A product orchestration engine IDE (e.g. product orchestration engine IDE 502) can determine resource requirements through automated testing. A product orchestration engine IDE can use product orchestration engine dependencies data that is determined via dependency resolution automation techniques to provision or to connect product dependencies.

For example, a developer can develop an application product orchestration engine that has a dependency on a cloud computing virtualization platform, which in turn has a dependency on a hyperconverged system. Then, a product orchestration engine IDE tool can access a product orchestration engine get usage API call to retrieve resource consumption and performance data to collect resource requirements as a function of offering quantities (e.g., from resources 512). A result can then be used to determine a resource requirements declaration (e.g., resource requirements declaration 506).

FIG. 6 illustrates an example system architecture 600 for product orchestration engine container image optimization that can facilitate creating product orchestration engines, in accordance with an embodiment of this disclosure. In some examples, part(s) of system architecture 600 can be used to implement creating product orchestration engines component 104 of FIG. 1.

System architecture 602 comprises product orchestration engine container image 602. In turn product orchestration engine container image 602 comprises base image 604, orchestrator base image 606, cloud orchestrator base image 608, and hybrid cloud orchestrator 610.

Base image 604 comprises an operating system container image, along with a user account, templates for mapping information and catalog information, a runtime environment for a first programming language, and a capability to access a remote repository for projects published in the first programming language.

Orchestrator base image 606 can be similar to container base image 302 of FIG. 3, and the components of orchestrator base image 606 can be similar to respective components of container base image 302. That is, orchestrator base image comprises intelligent base container image 612 (which can be similar to intelligent base container image 316), infrastructure provisioning tools 614 (which can be similar to infrastructure provisioning tools 314), product orchestration engine 616 (which can be similar to product orchestration engine 312), mapping information 618 (which can be similar to mapping information 308), catalog information 620 (which can be similar to catalog information 310), and API microservice 622 (which can be similar to API microservice 306). Additionally, REST API 624 can be similar to REST API 304.

API microservice 306, mapping information 308, catalog information 310, infrastructure provisioning tools 314, and intelligent base container image 316.

Cloud orchestrator base image 608 can comprise a component that provides for automating functions to manage executing workloads on cloud computing service platforms. Hybrid cloud orchestrator base image 610 comprise a component that provides for automating functions to manage executing workloads on hybrid computing service platforms that combine cloud computing service platforms and on premises computing platforms.

System architecture 600 can be utilized to simplify a product orchestration engine development process can involve product orchestration engine container image optimization automation. A product orchestration engine IDE can optimize a product orchestration engine container image size to minimize an overall container image size in a container image registry, as well as minimize container runtime memory consumption.

One approach to optimizing an overall product orchestration engine container image size in a target runtime environment can be a brute force approach to install exactly tools and providers in a product orchestration image depending on a result of tooling installation automation. Another approach to optimizing an overall product orchestration engine container image size in a target runtime environment can be to create a set of base images (e.g., base image 604). Base images can be built upon a secured based operating system container image, then adding a user account, templates for mapping API calls to scripts and resource requirements, and programming environment installations. A base image can be shared by product orchestration engines and infrastructure microservices.

Three layers of product orchestration engine specific container base images can be added on top of each other and on top of the base image. At a lowest layer can be an orchestrator base image (e.g., orchestrator base image 606), which can be useful to develop infrastructure as a service (IaaS) level product orchestration engines. This layer can contain configuration and provision automation tools. At a next higher level, there can be cloud orchestration tools added for deploying products to clouds (e.g., cloud orchestrator base image 608). At a next higher level, public cloud provision and life cycle management tools can be added to provide for hybrid cloud orchestration (e.g., hybrid cloud orchestrator base image 610). This approach can result in a minimal overall container image size in that a product orchestration engine container image can contain, roughly, product scripts, dependency and API mapping information, and a list of tooling provider and modules that are not included in the base images.

Example Process Flows

FIG. 7 illustrates an example process flow 700 for creating product orchestration engines, in accordance with an embodiment of this disclosure. In some examples, one or more embodiments of process flow 700 can be implemented by creating product orchestration engines component 104 of FIG. 1, or computing environment 1002 of FIG. 10.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 800 of FIG. 8 and/or process flow 900 of FIG. 9.

Process flow 700 begins with 702, and moves to operation 704. Operation 704 depicts receiving information about a first orchestration service that indicates a mapping from an API to an executable script, and a dependency of the first orchestration service on a second orchestration service. In some examples, a first orchestration service can be a product orchestration engine of product orchestration engines 110. In some examples, the information received can be mapper and catalog files for that product orchestration engine.

After operation 704, process flow 700 moves to operation 706.

Operation 706 depicts, in response to receiving the information, creating a base container image for the first orchestration service.

After operation 706, process flow 700 moves to operation 708.

Operation 708 depicts associating the API with executing the executable script on the base container image. That is, the mapper file can provide an association between API calls that can be made to the orchestration service and scripts that are executed by the orchestration service in response to receiving a corresponding API call.

After operation 708, process flow 700 moves to operation 710.

Operation 710 depicts associating the dependency of the first orchestration service on the second orchestration service with the base container image. That is, the catalog file can identify one or more dependencies that service provided by the first orchestration service has.

After operation 710, process flow 700 moves to operation 712.

Operation 712 depicts, in response to receiving data indicative of a request to create an instance of the first orchestration service, creating an instance of the base container image. This base container image can host an instance of the first orchestration service.

In some examples, the instance is a first instance, the base container image is a first base container image, and the creating of the first instance of the base container image comprises creating a second instance of a second base container image that corresponds to the second orchestration service. That is, where there are dependencies, other container instances can be created to process those dependencies.

In some examples, determining to create the second instance of the second base container image can be based on the dependency of the first orchestration service on the second orchestration service. That is, the dependency information for the first instance can be stored within the first base container image.

In some examples, creating the second instance of the second base container image comprises issuing an API call according to the API indicative of creating the second instance of the second base container image.

In some examples, the data indicative of the request to create the instance of the first orchestration service comprises an API call according to the API. That is, an API call can be issued to create the instance. In some examples, the creating of the instance of the base container image comprises executing the executable script on the instance of the base container image. That is, a result of processing the API call can involve triggering the execution of a script on the instance.

In some examples, operation 712 comprises creating a user account on the base container image.

After operation 712, process flow 700 moves to 714, where process flow 700 ends.

FIG. 8 illustrates another example process flow 800 for creating product orchestration engines, in accordance with an embodiment of this disclosure. In some examples, one or more embodiments of process flow 800 can be implemented by creating product orchestration engines component 104 of FIG. 1, or computing environment 1002 of FIG. 10.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 700 of FIG. 7 and/or process flow 900 of FIG. 9.

Process flow 800 begins with 802, and moves to operation 804. Operation 804 depicts receiving information about an orchestration service that indicates a mapping from an API to an executable script. In some examples, operation 804 can be implemented in a similar manner as operation 704 of FIG. 7.

After operation 804, process flow 800 moves to operation 806.

Operation 806 depicts, based on the information, creating a base container image for the orchestration service. In some examples, operation 806 can be implemented in a similar manner as operation 706 of FIG. 7.

After operation 806, process flow 800 moves to operation 808.

Operation 808 depicts associating the API with executing the executable script on the base container image. In some examples, operation 808 can be implemented in a similar manner as operation 708 of FIG. 7.

In some examples, operation 808 comprises enabling a runtime environment for a first programming language on the base container image. In some examples, operation 808 comprises enabling a capability to access a remote repository for projects published in the first programming language.

In some examples, operation 808 comprises inspecting a second script associated with the orchestration service to identify a configuration management tool associated with the orchestration service, enabling the configuration management tool on the base container image. An example of inspecting can involve using information in the file name to determine how the file is organized, and what data it contains. For example, a file "provision.py" can be determined to be a script file written in a Python programming language, while a file "provision.sh" can be determined to be a shell script file.

In some examples, operation 808 comprises parsing a second script associated with the orchestration service to identify a provider identity associated with a required provider associated with the orchestration service, and enabling the required provider on the base container image. In some examples, parsing can involve determining more information about a file type that has a name that indicates general information. For example, a file named "provision.yml" can be determined to be written in a "YAML Ain't Markup Language" (YAML) format. Parsing can involve examining instructions contained within a file to determine a language or format with which those instructions are expressed. A reason for inspecting and/or parsing a file can be to determine components to include in a container to run the file, where these components can include automation tools and dependent modules.

In some examples, operation 808 comprises parsing a second script associated with the orchestration service to identify a required module associated with the orchestration service, and installing the required module on the base container image.

After operation 808, process flow 800 moves to operation 810.

Operation 810 depicts, in response to receiving data indicative of a request to create an instance of the orchestration service, creating an instance of the base container image based on the data, and executing, by the system, the executable script on the instance of the base container image. In some examples, operation 810 can be implemented in a similar manner as operation 712 of FIG. 7.

After operation 810, process flow 800 moves to 812, where process flow 800 ends.

FIG. 9 illustrates another example process flow 900 for creating product orchestration engines, in accordance with an embodiment of this disclosure. In some examples, one or more embodiments of process flow 900 can be implemented by creating product orchestration engines component 104 of FIG. 1, or computing environment 1002 of FIG. 10.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 700 of FIG. 7 and/or process flow 800 of FIG. 8.

Process flow 900 begins with 902, and moves to operation 904. Operation 904 depicts creating a base container image for an orchestration service. In some examples, operation 904 can be implemented in a similar manner as operation 706 of FIG. 7.

In some examples, operation 904 comprises registering the orchestration service with a central registry that maintains information about available orchestration services. In some examples, the central registry maintains dependency information representative of respective dependencies of the available orchestration services. That is, in some examples, a product orchestration engine registry can be maintained, and dependency resolution can be performed via this registry.

In some examples, operation 904 comprises determining an amount of resources or performance of the base container image based on a resource or performance requirement of the orchestration service. That is, a container can be selected or created to satisfy resource requirements of the orchestration service that will operate on the container.

In some examples, operation 904 comprises enabling configuration and provision automation tools for the base container image. In some examples, operation 904 comprises enabling cloud orchestration or provision tools for the base container image.

After operation 904, process flow 900 moves to operation 906.

Operation 906 depicts associating an API call with executing an executable script that corresponds to the orchestration service on the base container image. In some examples, operation 906 can be implemented in a similar manner as operation 708 of FIG. 7.

After operation 906, process flow 900 moves to operation 908.

Operation 908 depicts, in response to receiving data indicative of the API call, creating an instance of the base container image, and executing the executable script on the instance of the base container image. In some examples, operation 908 can be implemented in a similar manner as operation 712 of FIG. 7.

After operation 908, process flow 900 moves to 910, where process flow 900 ends.

Example Operating Environment

In order to provide additional context for various embodiments described herein, FIG. 10 and the following discussion are intended to provide a brief, general description of a suitable computing environment 1000 in which the various embodiments of the embodiment described herein can be implemented.

For example, parts of computing environment 1000 can be used to implement one or more embodiments of computer system 102 of FIG. 1.

In some examples, computing environment 1000 can implement one or more embodiments of the process flows of FIGS. 7-9 to facilitate creating product orchestration engines.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a nonvolatile storage such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
receiving information about a first orchestration service that indicates a mapping from an application programming interface (API) to an executable script, and a dependency of the first orchestration service on a second orchestration service;
in response to receiving the information, creating a base container image for the first orchestration service;
associating the API with executing the executable script on the base container image;
associating the dependency of the first orchestration service on the second orchestration service with the base container image; and
in response to receiving data indicative of a request to create an instance of the first orchestration service, creating an instance of the base container image.

2. The system of claim 1, wherein the data indicative of the request to create the instance of the first orchestration service comprises an API call according to the API.

3. The system of claim 2, wherein the creating of the instance of the base container image comprises:
executing the executable script on the instance of the base container image.

4. The system of claim 1, wherein the instance is a first instance, wherein the base container image is a first base container image, and wherein the creating of the first instance of the base container image comprises:
creating a second instance of a second base container image that corresponds to the second orchestration service.

5. The system of claim 4, wherein the operations further comprise:

determining to create the second instance of the second base container image based on the dependency of the first orchestration service on the second orchestration service.

6. The system of claim 4, wherein the creating the second instance of the second base container image comprises:
issuing an API call according to the API indicative of creating the second instance of the second base container image.

7. The system of claim 1, wherein the operations further comprise:
creating a user account on the base container image.

8. A method, comprising:
receiving, by a system comprising a processor, information about an orchestration service that indicates a mapping from an application programming interface (API) to an executable script;
based on the information, creating, by the system, a base container image for the orchestration service;
associating, by the system, the API with executing the executable script on the base container image; and
in response to receiving data indicative of a request to create an instance of the orchestration service,
creating, by the system, an instance of the base container image based on the data, and
executing, by the system, the executable script on the instance of the base container image.

9. The method of claim 8, further comprising:
enabling, by the system, a runtime environment for a first programming language on the base container image.

10. The method of claim 9, further comprising:
enabling, by the system, a capability to access a remote repository for projects published in the first programming language.

11. The method of claim 8, wherein the executable script is a first script, and further comprising:
inspecting, by the system, a second script associated with the orchestration service to identify a configuration management tool associated with the orchestration service; and
enabling, by the system, the configuration management tool on the base container image.

12. The method of claim 8, wherein the executable script is a first script, and further comprising:
inspecting, by the system, a second script associated with the orchestration service to identify a provisioning automation tool associated with the orchestration service; and
enabling, by the system, the provisioning automation tool on the base container image.

13. The method of claim 8, wherein the executable script is a first script, and further comprising:
parsing, by the system, a second script associated with the orchestration service to identify a provider identity associated with a required provider associated with the orchestration service; and
enabling, by the system, the required provider on the base container image.

14. The method of claim 8, wherein the executable script is a first script, and further comprising:
parsing, by the system, a second script associated with the orchestration service to identify a required module associated with the orchestration service; and
installing, by the system, the required module on the base container image.

15. A non-transitory computer-readable medium comprising instructions that, in response to execution, cause a system comprising a processor to perform operations, comprising:
creating a base container image for an orchestration service;
associating an application programming interface (API) call with executing an executable script that corresponds to the orchestration service on the base container image; and
in response to receiving data indicative of the API call, creating an instance of the base container image, and executing the executable script on the instance of the base container image.

16. The non-transitory computer-readable medium of claim 15, wherein the operations further comprise:
registering the orchestration service with a central registry that maintains information about available orchestration services.

17. The non-transitory computer-readable medium of claim 16, wherein the central registry maintains dependency information representative of respective dependencies of the available orchestration services.

18. The non-transitory computer-readable medium of claim 15, wherein the operations further comprise:
determining an amount of resources or performance of the base container image based on a resource or performance requirement of the orchestration service.

19. The non-transitory computer-readable medium of claim 15, wherein the operations further comprise:
enabling configuration and provision automation tools for the base container image.

20. The non-transitory computer-readable medium of claim 15, wherein the operations further comprise:
enabling cloud orchestration or provision tools for the base container image.

* * * * *